(12) United States Patent
Buckingham et al.

(10) Patent No.: US 11,218,478 B1
(45) Date of Patent: *Jan. 4, 2022

(54) SECURITY PLATFORM

(71) Applicant: United Services Automobile Association (USAA), San Antonio, TX (US)

(72) Inventors: Thomas Bret Buckingham, Fair Oaks Ranch, TX (US); James Karras, Boerne, TX (US); John Shelton, San Antonio, TX (US); Michael Wayne Lester, Fair Oaks Ranch, TX (US); Bharat Prasad, San Antonio, TX (US); James Eric McCarty, Helotes, TX (US); Gabriel C. Fernandez, San Antonio, TX (US); Debra Randall Casillas, Helotes, TX (US); Sudarshan Rangarajan, San Antonio, TX (US); Christopher Thomas Wilkinson, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 80 days.

This patent is subject to a terminal disclaimer.

(21) Appl. No.: 16/539,006

(22) Filed: Aug. 13, 2019

Related U.S. Application Data

(63) Continuation of application No. 15/253,274, filed on Aug. 31, 2016, now Pat. No. 10,425,414.
(Continued)

(51) Int. Cl.
*H04L 29/06* (2006.01)
*G06F 8/61* (2018.01)
(Continued)

(52) U.S. Cl.
CPC .......... *H04L 63/0884* (2013.01); *G06F 8/61* (2013.01); *G06F 21/31* (2013.01); *G06F 21/35* (2013.01); *H04L 63/083* (2013.01)

(58) Field of Classification Search
CPC ..... H04L 63/0884; H04L 63/083; G06F 8/61; G06F 21/35; G06F 21/31
See application file for complete search history.

(56) References Cited

U.S. PATENT DOCUMENTS

| | | | |
|---|---|---|---|
| 6,757,262 B1 * | 6/2004 | Weisshaar | H04L 29/06 370/310 |
| 8,539,567 B1 * | 9/2013 | Logue | H04L 63/0815 726/7 |

(Continued)

OTHER PUBLICATIONS

Cirani et al., "An Oauth-based Authorization Service Architecture for Secure Services in iot Scenarios," IEEE Sensors Journal, 15(2), pp. 1224-1234, pp. 1-12, dated Feb. 2015.
(Continued)

*Primary Examiner* — James R Turchen
(74) *Attorney, Agent, or Firm* — Fish & Richardson P.C.

(57) ABSTRACT

Methods, systems, and apparatus, including computer programs encoded on computer storage media, for interconnecting devices. One of the methods includes authenticating, by a security platform, a user. The method includes generating, by the security platform, an authentication token for the user. The method includes receiving a selection of an IoT application by the user, the IoT application configured to control an IoT device. The method includes providing, by the security platform, the authentication token to the IoT application to authenticate the user with the selected application. The method also includes providing, by the selected application, control of the IoT device to the user.

20 Claims, 7 Drawing Sheets

Related U.S. Application Data

(60) Provisional application No. 62/212,430, filed on Aug. 31, 2015.

(51) Int. Cl.
*G06F 21/31* (2013.01)
*G06F 21/35* (2013.01)

(56) References Cited

U.S. PATENT DOCUMENTS

| | | | | |
|---|---|---|---|---|
| 8,843,239 | B2* | 9/2014 | Mighdoll | H04L 12/2809 |
| | | | | 700/277 |
| 9,172,698 | B1* | 10/2015 | Evans | G06F 21/34 |
| 9,538,578 | B1* | 1/2017 | Stamatakis | G06F 3/0482 |
| 9,614,852 | B2* | 4/2017 | Kiriyama | H04L 63/20 |
| 9,654,461 | B2* | 5/2017 | Seibert, Jr. | H04L 9/0819 |
| 9,668,085 | B2* | 5/2017 | Pi-Sunyer | H04L 12/2829 |
| 9,703,570 | B2* | 7/2017 | Herberg | G06F 9/4411 |
| 9,774,595 | B2* | 9/2017 | Omnes | H04W 12/08 |
| 9,820,120 | B2* | 11/2017 | deCharms | H04L 65/1059 |
| 9,838,390 | B2* | 12/2017 | Zakaria | H04L 63/0876 |
| 9,843,624 | B1* | 12/2017 | Taaghol | H04L 63/0227 |
| 9,853,965 | B2* | 12/2017 | Yin | H04W 12/06 |
| 10,148,629 | B1* | 12/2018 | Roth | H04L 63/0838 |
| 2006/0029223 | A1* | 2/2006 | Ari | H04L 9/0656 |
| | | | | 380/28 |
| 2006/0062201 | A1* | 3/2006 | Funk | H04L 67/125 |
| | | | | 370/352 |
| 2006/0129627 | A1* | 6/2006 | Phillips | H04L 67/06 |
| | | | | 709/200 |
| 2008/0031456 | A1* | 2/2008 | Harrison | H04L 9/0656 |
| | | | | 380/278 |
| 2008/0267101 | A1* | 10/2008 | Webb | H04L 67/12 |
| | | | | 370/310 |
| 2010/0138908 | A1* | 6/2010 | Vennelakanti | G06F 21/33 |
| | | | | 726/11 |
| 2010/0287547 | A1* | 11/2010 | Korkishko | G06F 21/57 |
| | | | | 717/177 |
| 2011/0289576 | A1* | 11/2011 | Cheng | H04L 9/0877 |
| | | | | 726/9 |
| 2012/0084846 | A1* | 4/2012 | Weis | G06F 21/34 |
| | | | | 726/6 |
| 2012/0137301 | A1* | 5/2012 | Roslak | H04M 15/88 |
| | | | | 718/103 |
| 2014/0003600 | A1* | 1/2014 | Cooke | H04L 9/0618 |
| | | | | 380/28 |
| 2014/0047322 | A1* | 2/2014 | Kim | G06F 40/143 |
| | | | | 715/234 |
| 2014/0080467 | A1* | 3/2014 | Urbanek | H04W 8/18 |
| | | | | 455/418 |
| 2014/0086412 | A1* | 3/2014 | Shibata | H04L 9/0852 |
| | | | | 380/255 |
| 2014/0108943 | A1* | 4/2014 | Lee | H04W 4/18 |
| | | | | 715/738 |
| 2014/0164764 | A1* | 6/2014 | Pushkin | H04L 63/0884 |
| | | | | 713/156 |
| 2014/0281523 | A1* | 9/2014 | Golino | H04W 12/104 |
| | | | | 713/168 |
| 2014/0357187 | A1* | 12/2014 | Ehrensvard | H04B 5/0031 |
| | | | | 455/41.1 |
| 2015/0002261 | A1* | 1/2015 | Schiavi | G07C 1/20 |
| | | | | 340/5.8 |
| 2015/0113172 | A1* | 4/2015 | Johnson | H04L 67/125 |
| | | | | 709/245 |
| 2015/0222621 | A1* | 8/2015 | Baum | H04L 63/0823 |
| | | | | 726/9 |
| 2015/0229643 | A1* | 8/2015 | Kiriyama | G06F 21/6218 |
| | | | | 726/4 |
| 2015/0244690 | A1* | 8/2015 | Mossbarger | H04L 9/006 |
| | | | | 713/171 |
| 2015/0281002 | A1* | 10/2015 | Xu | H04L 41/24 |
| | | | | 709/223 |
| 2015/0295763 | A1* | 10/2015 | Yu | H04L 41/08 |
| | | | | 726/4 |
| 2015/0312256 | A1* | 10/2015 | Seibert, Jr | G06F 21/44 |
| | | | | 726/8 |
| 2015/0373149 | A1* | 12/2015 | Lyons | G05B 17/02 |
| | | | | 709/203 |
| 2015/0381776 | A1* | 12/2015 | Seed | H04L 67/16 |
| | | | | 709/203 |
| 2016/0072839 | A1* | 3/2016 | Mortimore, Jr. | H04L 63/20 |
| | | | | 726/1 |
| 2016/0075034 | A1* | 3/2016 | Laurent | G05B 15/02 |
| | | | | 700/264 |
| 2016/0112260 | A1* | 4/2016 | Pai | H04L 63/205 |
| | | | | 709/222 |
| 2016/0112262 | A1* | 4/2016 | Johnson | H04L 61/1511 |
| | | | | 709/221 |
| 2016/0112429 | A1* | 4/2016 | Sundaresan | H04L 63/08 |
| | | | | 726/4 |
| 2016/0135241 | A1* | 5/2016 | Gujral | H04L 67/12 |
| | | | | 370/328 |
| 2016/0164884 | A1* | 6/2016 | Sriram | G06Q 10/087 |
| | | | | 705/51 |
| 2016/0191483 | A1* | 6/2016 | Larson | H04L 63/0428 |
| | | | | 713/168 |
| 2016/0203572 | A1* | 7/2016 | Mcconaghy | G06Q 20/10 |
| | | | | 705/58 |
| 2016/0212099 | A1* | 7/2016 | Zou | H04L 63/0263 |
| 2016/0262021 | A1* | 9/2016 | Lee | H04L 63/0807 |
| 2016/0280149 | A1* | 9/2016 | Nakano | B60R 11/0235 |
| 2016/0308957 | A1* | 10/2016 | Zhang | G06F 9/4484 |
| 2016/0328550 | A1* | 11/2016 | Pritchard | G06F 21/35 |
| 2016/0350096 | A1* | 12/2016 | Pipilas | G06F 8/65 |
| 2016/0352673 | A1* | 12/2016 | Flores | H04L 67/306 |
| 2017/0031874 | A1* | 2/2017 | Boudville | G06Q 20/3229 |
| 2017/0046173 | A1* | 2/2017 | Moraes | G06F 1/1684 |

OTHER PUBLICATIONS

Dixon, C., Mahajan, R., Agarwal, S., Brush, A.J., Lee, B., Saroiu, S. and Bahl, P., Apr. 2012. An operating system for the home. In Proceedings of the 9th USENIX conference on Networked Systems Design and Implementation (pp. 25-25). USENIX Association. (Year: 2012).

Dixon, C., Mahajan, R., Agarwal, S., Brush, A.J., Lee, B., Saroiu, S. and Bahl, V., Oct. 2010. The home needs an operating system (and an app store). In Proceedings of the 9th ACM SIGCOMM Workshop on Hot Topics in Networks (p. 18). ACM. (Year: 2010).

https://nest.com/works-with-nesti; retrieved from Wayback on Feb. 15, 2018; Jan. 10, 2015 (Year: 2015).

Tschofenig, The Oauth 2.0 Internet of Things (IoT) Client Credentials Grant, Work in Progress, 66, pp. 1-10, dated Jul. 4, 2014.

Yegulap, "There's a (cloud) app for that: Microsoft adds store to Azure," Info World, dated Jul. 15, 2014.

Cirani et al., "An Oauth-based Authorization Service Architecture for Secure Services in iot Scenarios," IEEE Sensors Journal, 15(2), pp. 1224-1234, pp. 1-12, dated Feb. 2015, 12 pages.

Dixon, C., Mahajan, R., Agarwal, S., Brush, A.J., Lee, B., Saroiu, S. and Bahl, P., Apr. 2012. "An operating system for the home," Proceedings of the 9th USENIX conference on Networked Systems Design and Implementation,. USENIX Association, (Year: 2012), 16 pages.

Dixon, C., Mahajan, R., Agarwal, S., Brush, A.J., Lee, B., Saroiu, S. and Bahl, V., "The home needs an operating system (and an app store)," Proceedings of the 9th ACM SIGCOMM Workshop on Hot Topics in Networks, ACM, Oct. 2010, 6 pages.

https://nest.com/works-with-nest; retrieved from Wayback Machine on Sep. 25, 2019 (<https://web.archive.org/web/20150112044821/ https://nest.com/works-with-nest/>); Jan. 12, 2015, 5 pages.

Tschofenig, "The Oauth 2.0 Internet of Things (IoT) Client Credentials Grant," Work in Progress, 66, dated Jul. 4, 2014, 10 pages.

(56) References Cited

OTHER PUBLICATIONS

Yegulap, "There's a (cloud) app for that: Microsoft adds store to Azure," Info World, dated Jul. 15, 2014, 4 pages.

\* cited by examiner

SECURITY PLATFORM

CLAIM OF PRIORITY

This application is a continuation application of and claims priority to U.S. application Ser. No. 15/253,274, filed on Aug. 31, 2016, which claims priority to U.S. Application Ser. No. 62/212,430, filed on Aug. 31, 2015, entitled "SECURITY PLATFORM," the entire contents of which are incorporated herein.

BACKGROUND

The Interconnected devices, sometimes referred to as the Internet of Things, includes a network of physical objects (referred to as IoT devices) embedded with electronics, software, sensors and connectivity to enable it to achieve greater value and service by exchanging data with the manufacturer, operator and/or other connected devices. Each IoT device is uniquely identifiable and is able to interoperate within the existing Internet infrastructure.

SUMMARY

This specification describes technologies relating to interconnected devices.

In general, one innovative aspect of the subject matter described in this specification can be embodied in methods that include the actions of authenticating, by a security platform, a user. The methods include the actions of generating, by the security platform, an authentication token for the user. The methods include the actions of receiving a selection of at least one IoT application by the user, the at least one IoT application configured to control at least one IoT device. The method includes the actions of providing, by the security platform, the authentication token to the at least one IoT application to authenticate the user with the selected application. The method also includes the actions of providing, by the selected application, control of the at least one IoT device to the user.

Particular embodiments of the subject matter described in this specification can be implemented so as to realize one or more of the following advantages. A user's physical and data security may be improved. The login process may be simplified. Disparate IoT devices may interact and coordinate through a centralized application.

The foregoing and other embodiments can each optionally include one or more of the following features, alone or in combination. The methods may include the actions of receiving a selection of an uninstalled IoT application from a list of certified IoT applications. The IoT applications may be certified as functioning with the security platform. The methods may include the actions of installing the uninstalled IoT application. The methods may include the actions of sending a command to a first IoT device based on a trigger provided by a second IoT device. The methods may include the actions of sending a command to a first IoT device based on a location of a client device. The methods may include the actions of certifying, by a computer system, a first IoT application for use with the security platform. Certifying may include verifying that the first IoT application will accept a first authentication token as proof of identify, and verifying that the first IoT application provides a predetermined level of security. The methods may include the actions of tracking the ownership of at least one IoT devices controlled by the user. Tracking may include adding records of IoT devices owned by the user to a blockchain. Tracking may include one of adding a record indicating that an IoT device of the at least one IoT devices was acquired by the user and adding a recording indicating that an IoT device was relinquished by the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
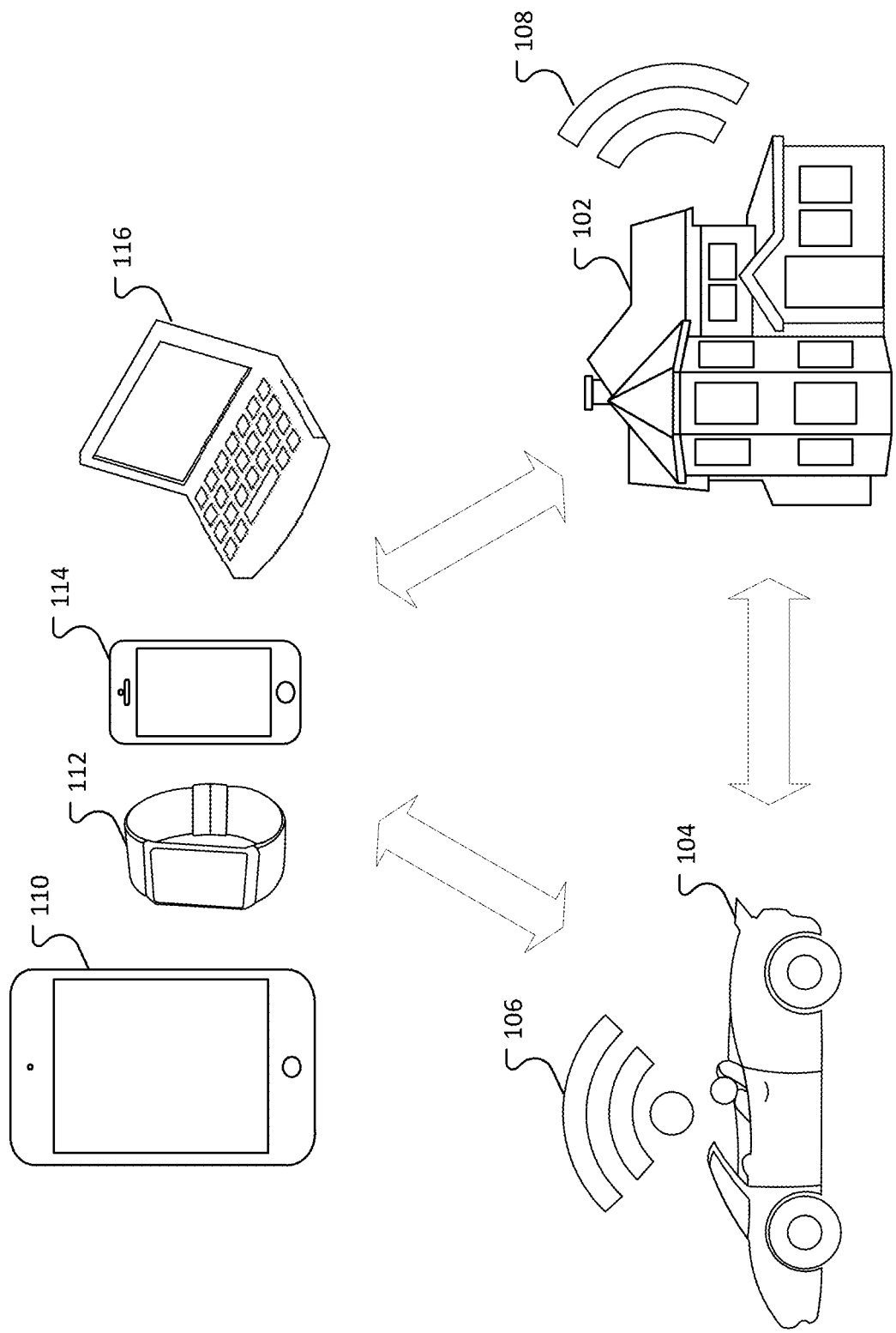
FIG. 1 illustrates an example of an environment include interconnected devices.

FIG. 1 illustrates an example of an environment include interconnected devices. There can be many different kinds of interconnected devices. Examples of IoT devices include devices in a house 102 such as thermostats, washer and dryers, alarm systems, light controls, TV/cable, Internet providers and other smart home features. IoT devices may also include mobile items such as automobiles. IoT devices may also include interaction centers such as fuel stations, banking ATMs, payment kiosks and points of sale. Each of these IoT devices may communicate (via, for example, wireless network signals 106, 108, including but not limited to cellular wireless protocols such as LTE and 4G communication protocols as well as wireless protocols consistent with the 802.11 standards) with one or more controller devices under the control of a user. A controller device may be, for example, a smart phone 114, tablet 110, computer 116, kiosk (not shown), smart watch 112, automotive dash board (not shown), or any other suitable electronic device. For example, a user may be able to control his thermostat, lights, or automobile using his smart phone or other device.

Figure 2:
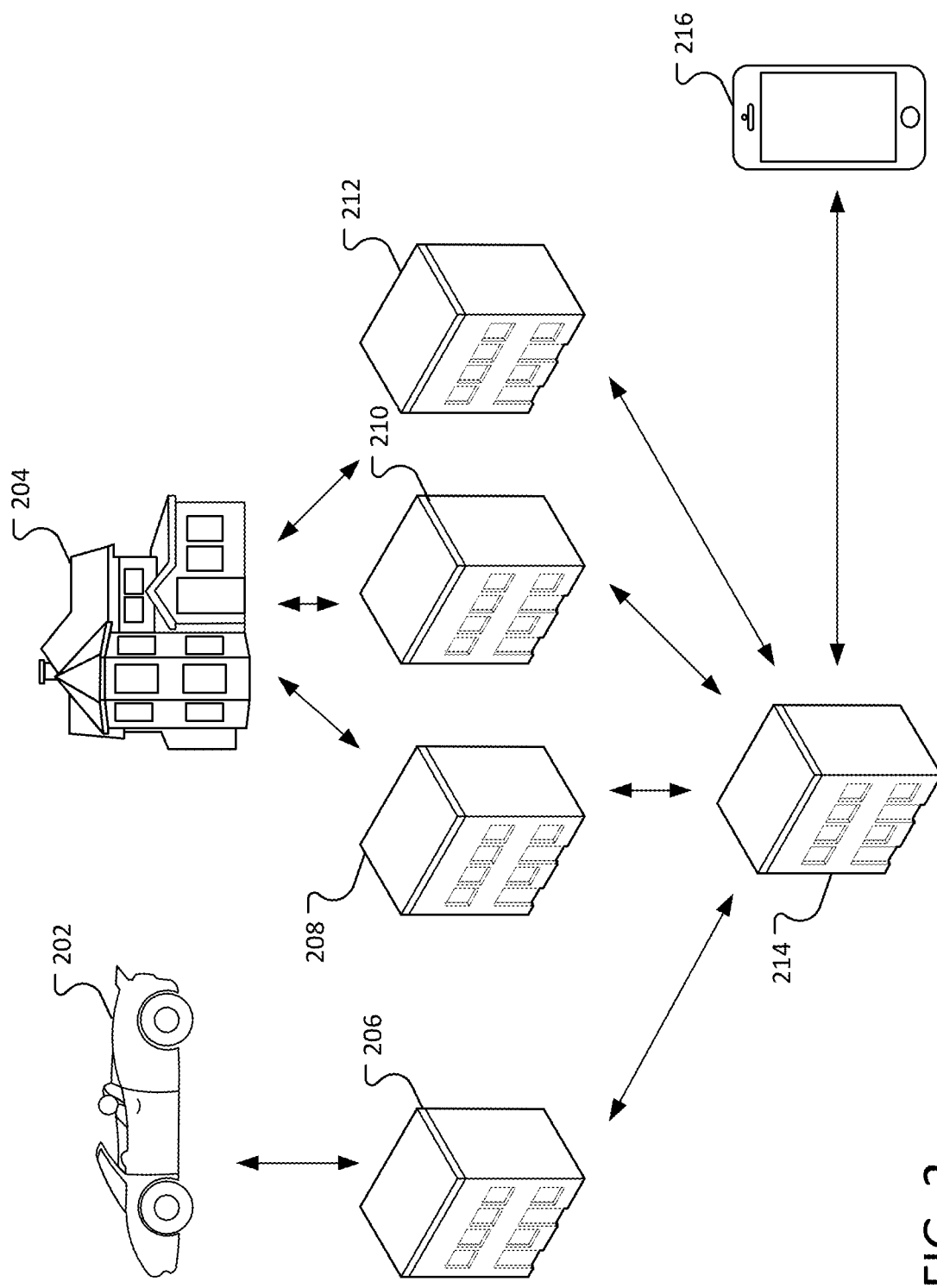
FIG. 2 illustrates an example environment for the internet of things.

FIG. 2 illustrates an example environment for the internet of things. Generally, different IoT devices may be provided by different companies. For example, an automobile 202 may include interconnectivity capabilities supplied by one company 206. A smart home 204 may include many different IoT devices that can each be provided by different companies 208, 210, 212. In general, the IoT devices may have disparate and inadequate security solutions. Whereas previously, technical vulnerabilities were contained to the wireless network, now physical aspects of an individual's home and possessions are vulnerable. For example, a security failure that previously would result in someone having access to your wireless network may now provide access to an alarm system, door locks, or automobile ignition.

A trusted company 214 may mitigate the risks associated with managing the security from disparate companies by providing a security platform to support a common security solution for a variety of different IoT devices. A trusted application executing on a client device 216 can be protected using multifactor authentication, including for example, biometrics, pass codes, pass words, and physical devices. Multifactor authentication generally refers to types of authentication falling into three categories. These categories can be described as something the user has, something the user knows, and something the user is. The first factor, something the user has, can be secured by limiting which devices are authorized to access the system. For example, a user may be required to register the client devices with the trusted company before the client device can be used to access the system.

The second factor, something the user knows, can include passcodes and passwords entered into an application executing on the client device 216. The passcodes and passwords can be provided to the system in order to provide verification that the user is authorized to use the system.

Figure 3:
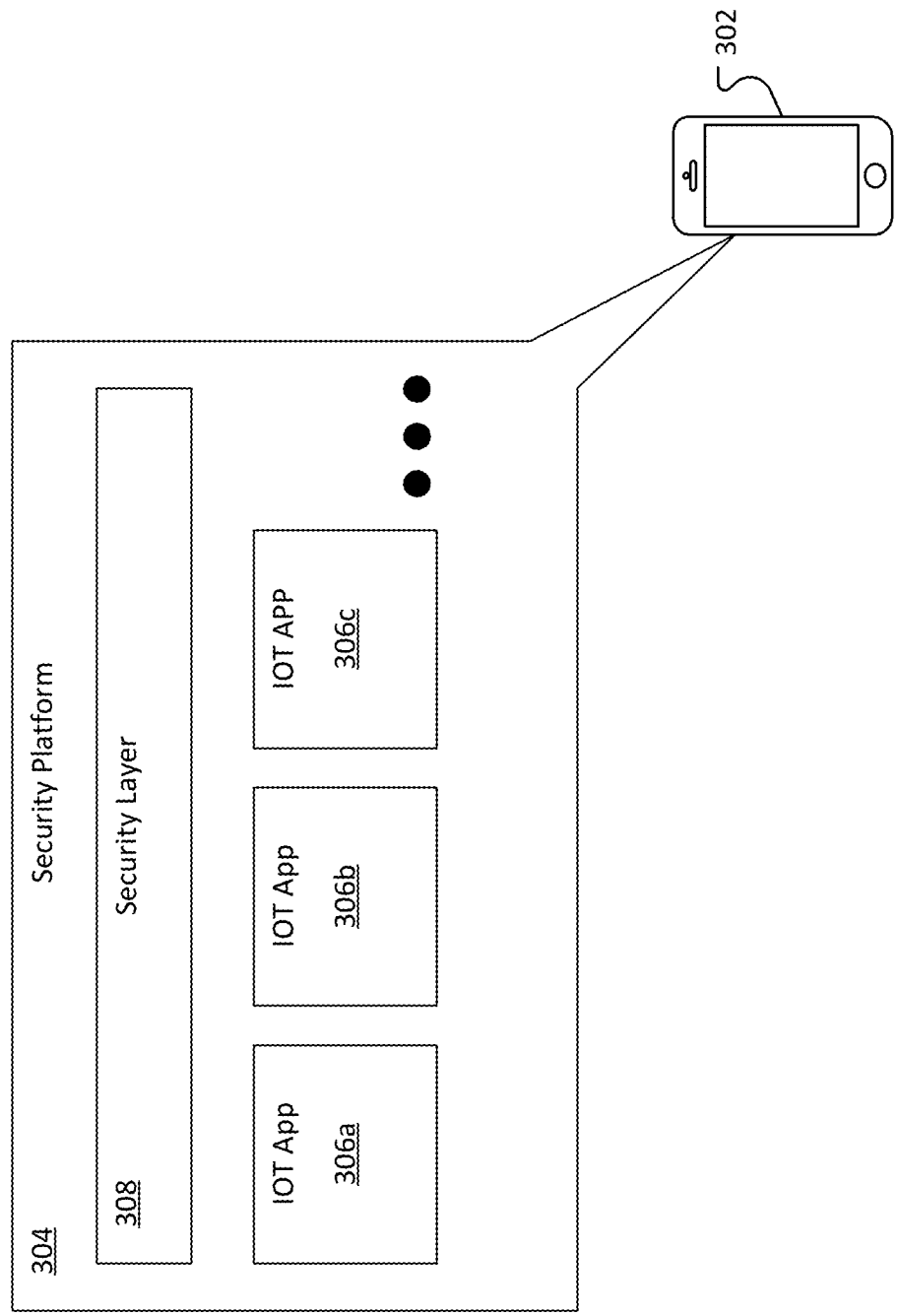
FIG. 3 illustrates an example of different applications integrated into the security platform on a client device.

The third factor, something the user is, can include biometric information. The biometric information can include measurement and analysis of body characteristics of the user (for example, fingerprints, eyes (e.g., retinas and irises), voice patterns etc.) In some implementations, the proximity between a control device and the IoT device may be used as a 4th authentication factor. The proximity can allow the security framework to do perform a risk assessment, including ground-speed rule violation between IoT devices and location-based behavior profiling. FIG. 3 illustrates an example of different applications integrated into the security platform on a client device. The client device 302 can be executing the security platform 304. The security platform can include a security layer 304 which manages the security of IoT apps 306a-c provided by third parties. The security platform 304 may include a Secure Hub that protects the network from malware, hacking, etc. and blocks unauthorized parties from accessing the system.

A user may authenticate with the security platform 304 on the client device 302. Once authenticated, the security platform 304 may receive and store an authentication token that can be used to authenticate the user to different IoT applications. In general, an IoT application is a software product that is used to control the IoT device. The security layer 308 can provide the authentication token to the IoT Apps 306a-c. The authentication token is accepted by the IoT Apps 306a-c as proof that the user has been authenticated by the security platform 304. In some implementations, the authentication token may be used once, requiring that a user re-authenticates with the framework each time the user accesses an IoT App. In some implementations, the authentication token may be valid for a period of time after authentication, for example 5 minutes, 10 minutes, 30 minutes, etc. . . . .

The security platform 304 may be able to securely wipe data from lost or stolen IoT devices. For example, if an IoT device is stolen, the user may be able to log into the security platform and execute a command for an IoT device that causes all data on the device to be deleted. The security platform 304 may also enable a user to track and monitor data/access of an IoT device. The tracking and monitoring of the device can include the ability to determine what is occurring with the IoT device in real-time (for example, what program is currently being displayed on a smart TV) and may also include the ability to review historical activities (for example, the programs that have been displayed on the smart TV over a period of time).

Figure 4:
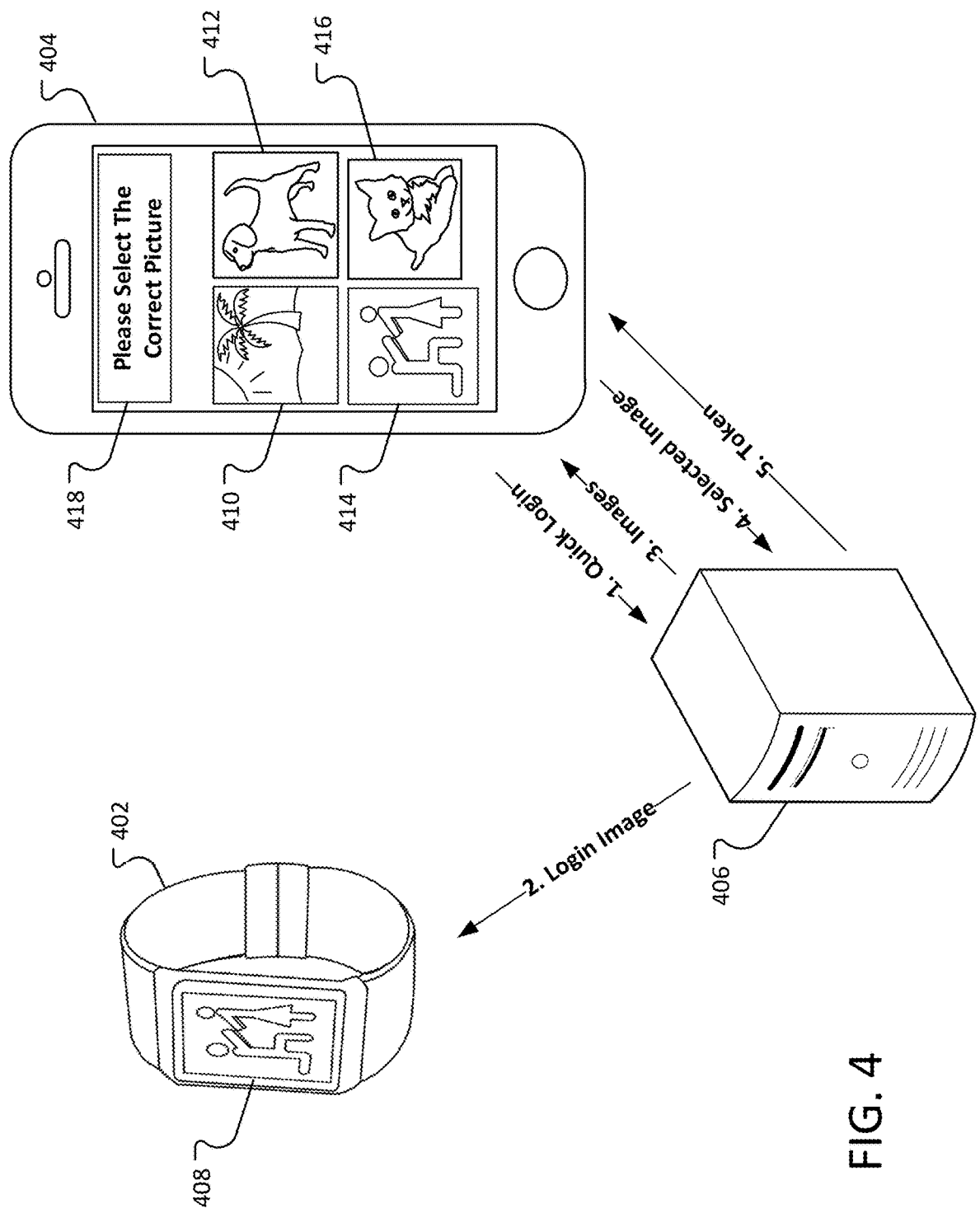
FIG. 4 illustrates an example simplified login process.

In some implementations, a user logged in with one user device may be able to perform a simplified login process to login on a second user device. FIG. 4 illustrates an example simplified login process. Although the example is described using a smart phone 404 and a smart watch 402 other client devices can be used, as described above.

In this example, a user may be logged in with a smart watch 402. The user wishes to log in with their smart phone 404. The smart phone sends a quick login (or alternatively, a general login request) to a computer system 406 that manages the login process. The computer system 406 determines that the user is already logged in using the smart watch 402. The computer system 406 sends an image 408 (in this example, an image of a couple) to the smart watch 402. The computer system 406 also sends a group of images to the smart phone 404. (in this example, images 410, 412, 414, 416). Although four images are shown in the figure more of fewer images may be provided.

The user interface of the smart phone 404 displays a message 418 requesting the user select the correct picture. The user interface also displays the received images. In this example image 410, 412, 414, and 416. The user selects an image and the selected image is provided to the computer system 406.

If the user selects the image that matches the image on the smart phone 404 displayed on the smart watch 404 then the computer system logs the user in on the smart phone 404 and sends a authentication token, as described above.

If the user does not select the image that matches the image on the smart phone, the login request is denied.

In some implementations, the quick login process may require additional credentials. For example, the user may be requested to enter a numeric passcode. Entering the passcode is generally considered quicker and easier than entering a complete alphanumeric password.

Once the user logs into the security platform, the user can be presented with a list of installed applications. The applications may be organized under a subheading, such as, "IoT Applications" or "Home Automation."

Figure 5:
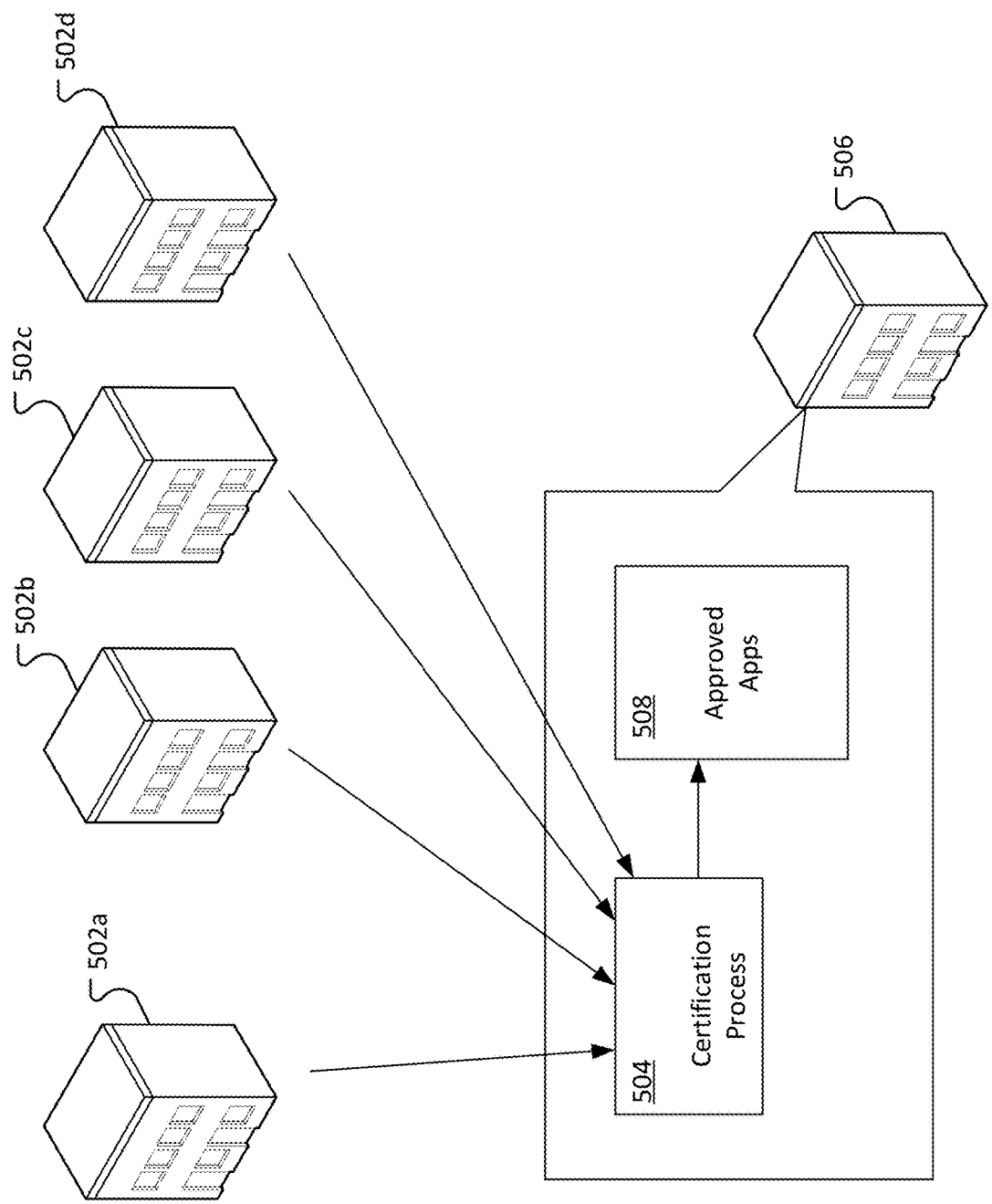
FIG. 5 illustrates an example of integrating IoT vendor apps with the security platform.

FIG. 5 illustrates an example of integrating IoT vendor apps with the security platform. The security platform may be configured to provide integrated security for IoT devices provided by multiple companies.

IoT applications may be provided by multiple companies 502a-d (for example, IoT vendors) for certification as compatible with the security platform. A certification process can check that the IoT applications accept the authentication token as a form of authentication and that the IoT applications provide a minimum security protection required by the security platform.

In some implementations, minimum security protection can include the ability to provide a verifiable assertion of identity to the client device (for example, the security platform and the client device should be able to verify that messages sent from the IoT device originate at the IoT device). The minimum security protection can also include the ability to restrict activities with the IoT device based on user authorization (for example, features of the IoT device may be able to be restricted based on the user who accesses the device). The minimum security protection can also include that communications with the IoT device are secure and protected and that a notification is available to the client device that the connectivity is secure and protected. The minimum security protections can also include a verification that the application has been approved for use within the platform.

When an application has been certified it can be added to a list of approved apps 508. New applications may be obtained by a user from a specialized application store, a specialized part of an app store, or from a general purpose app store. The applications may be tagged with a tag that indicates that the app has been certified (for example, the applications may be tagged with the phrase "Secure IoT Framework Compliant") for easy identification.

Figure 6:
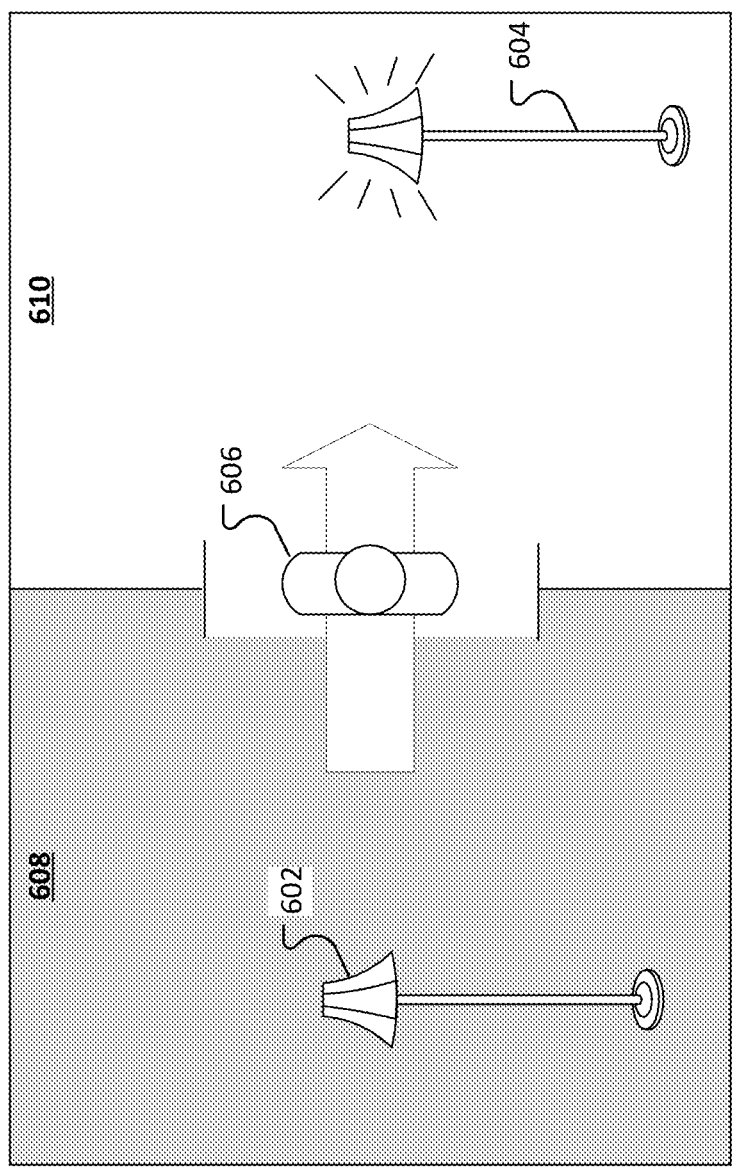
FIG. 6 illustrates an example of a location device on a client device interacting with IoT devices.

FIG. 6 illustrates an example of a location device on a client device interacting with IoT devices. In some implementations, the security platform enables advanced control of IoT devices via the IoT applications installed on client devices. For example, the client device may include an integrated GPS positioning system. The security platform on the client device may use the location of the user's client device to determine actions to cause the IoT devices to behave in a desired manner.

In this example, as the user 606 moves from one area 608 to another area 610, the client device shuts off the light 602 and turns on the light 604. Therefore lights may turn on and off as the user moves through the smart home. Other items may also be controlled. For example, the system may determine what music to play.

In some implementations, the security platform can also enable controlling the IoT device based on the time of day. For example, a user may prefer one type of music in the morning and another type of music in the evening. Certain lights in the house may be turned on or off based on the time. The security platform may automatically set a house alarm and close the garage door at a particular time. The security platform may pre-start a car in the morning so the temperature is comfortable when the user drives to work.

In some implementations, the security platform can control IoT devices based on information or events received from other IoT devices. For example, the security platform may receive an indication that the user's morning alarm has been turned off and may therefore start coffee brewing in a coffee maker.

The security platform supports the full life cycle of IoT device ownership, from the time the IoT device is installed until the time the IoT device is removed. When a user obtains a new IoT device, the user can download the corresponding IoT application from the app store and install the IoT application within the security platform. In some implementations, the security platform may communicate information about the user (with the user's permission), which is sufficient to register the user with the IoT device. In some implementations, the user may register with the IoT device directly and subsequently associate the registered IoT device with the security platform. Once registered, the user can control the IoT device using the IoT app executing within the security platform.

When an IoT device is removed, the user informs the system that the device has been removed. The security platform deletes the device and updates records indicating that the device is no longer available.

The security platform may also allow users to delegate authority to other users. For example, members of the household may be granted access to control the television. In some implementations, different users may be granted different levels of authority. For example, spouses may have full control over all IoT devices in the household, however, children may be granted only limited access to some of the devices (for example, children may be granted access to control the television but not be granted access to start a car or change the thermostat).

The security platform may allow the user to have multiple controller devices. For example, a user may own a smart phone, a tablet, a computer, or other controller devices. The security platform may associate each of the controller devices with the user.

In some implementations, device ownership (both controller and IoT devices) and permissions can be managed using blockchain technology. A blockchain is a public ledger of all transactions related to a domain that have ever been executed. The chain grows as completed blocks of recordings are added to the chain. Blocks are added to the chain in a linear chronological order. The chain can be shared by all the nodes that participate in the security platform. For example, the chain can be shared with one or more controller devices. The chain can also be shared with backend systems that are responsible for maintaining the integrity of the blockchains. Each block in the blockchain includes a hash value determined from the previous block in the blockchain. The hash value can be used to ensure that the blockchain has not been tampered with or altered.

A blockchain can be used to track IoT device ownership. For example, the blockchain may indicate that a user purchased a NEST thermostat. A later block may indicate that the user purchased an X10 home security system. A later block may indicate that the user removed the NEST thermostat.

A blockchain can be used to track the assignment of permissions to different users. For example, a block in the blockchain may indicate that a user has granted full permissions to all IoT devices to his spouse. A block in the blockchain may indicate that the user has granted permission to his daughter to drive the car. A later block in the blockchain may indicate that the user has revoked the permissions of the daughter to drive the car (for example, if the child is grounded). A later block may show that the permissions of the daughter to drive the car were re-granted.

A blockchain can be used to associate ownership of controller devices. For example, a block in the blockchain may indicate that a user has obtained a smart phone. When the user to goes to control an IoT device using the smart phone, the blockchain may be analyzed to determine whether the ownership of the smart phone is recorded in the blockchain and has not been removed. If the smart phone is owned by the user, then the security platform may provide access to the IoT devices through the smart phone, however, if the blockchain indicates that the smart phone has been removed from the chain (for example, sold or replaced) then the security platform may deny access to the smart phone.

A blockchain can be used as a vehicle for device-to-device interaction, verification and command execution. For example, an attic fan can receive trigger from an attic temperature sensor, validate the chain to ensure this is trusted, and actually have a 'smart contract' to execute an operation for the fan to turn on.

A blockchain can track and propagate authorized level of access between devices. For example, if a user has limited access control within the IoT framework, and the user interacts with device A, then blockchain can propagate the limited control to device B, to device C and so on, so that the user does not get complete control on devices B and C.

A blockchain can be used for tracking partner interactions with the security framework. This could indicate what IoT devices came into/went out of the security framework, payment and other liabilities that are associated with this, etc A blockchain can contain the IoT device 'signature.' The signature in the block chain provides as a verifiable method of identifying what constitutes an IoT device (for example, a smart coffee maker and all its parts can have a signature on the blockchain). The signature can be verified to identify a trusted IoT component/device that gets into the ecosystem and identify fraudulent/hacked devices from entering.

In one example, information that may be stored in the blockchain for a vehicle includes the identity of user and vehicle (such as ownership/co-ownership, lease/own identification, documents, e-signatures, add-ons (trim, navigation system, video, etc), VIN/year/make/model, fuel type, grade, vehicle registration, vehicle inspection, driver's license, insurance documents, vehicle sharing, vehicle sale). The information may include vehicle one-time and/or recurring costs (such as vehicle purchase, vehicle loan, vehicle insurance, vehicle maintenance, vehicle repair, tow truck fees, claims settlements). The information may include transactions performed on the vehicle (such as, fuel purchase, insurance payment, loan payment, maintenance/repair payment). The information may include information about driving performance (such as a performance score, environment friendly, fuel efficiency). The information may include information about roadside assistance. The information may include information about emergency contact information.

Figure 7:
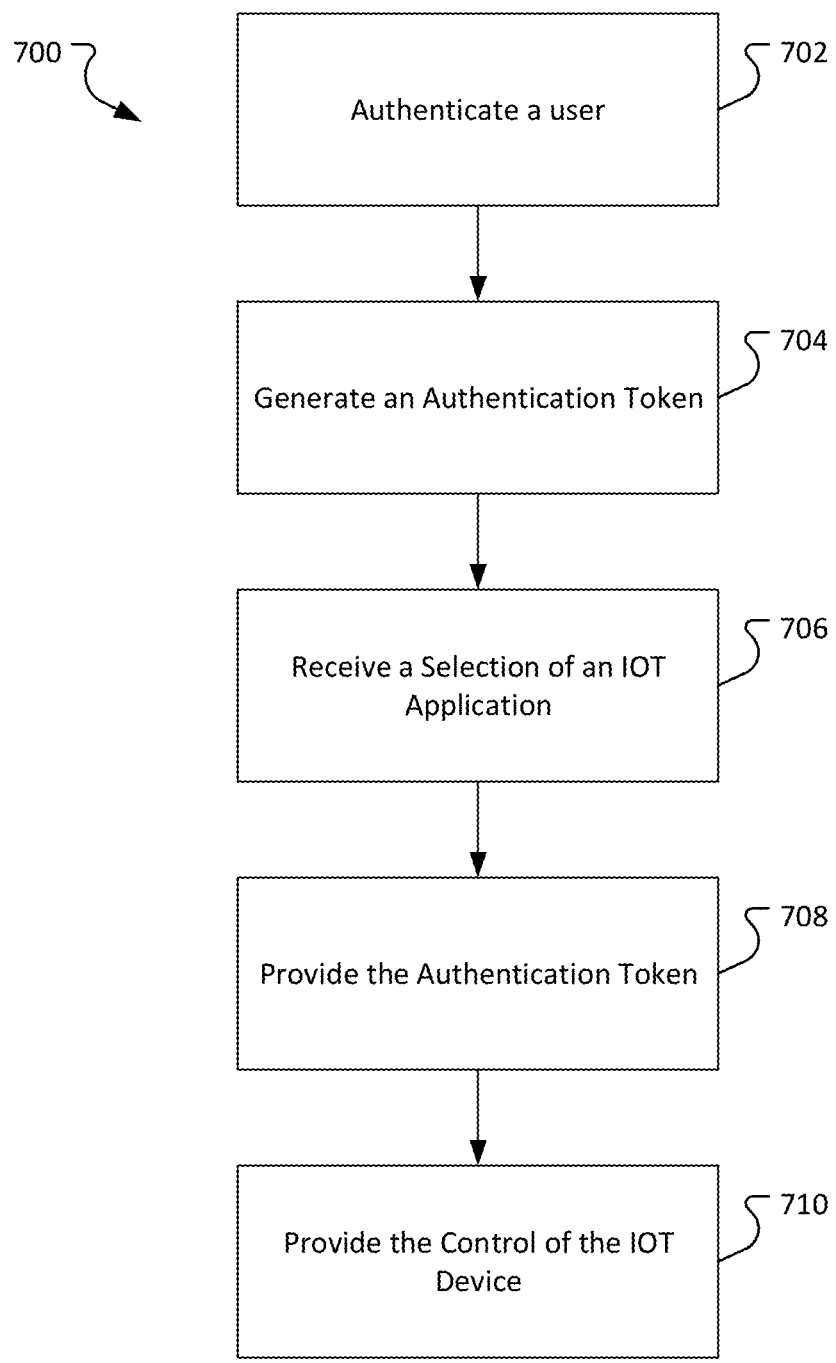
FIG. 7 is a flowchart to of an example process of accessing an IoT application using a security platform.

FIG. 7 is a flowchart to of an example process of accessing an IoT application using a security platform. The process may be performed by a computing device, for example, a server or similar system.

The process authenticates a user 702. The user may be authenticated based on a multifactor authentication process or using a quick authentication process, as described above.

The process generates an authentication token 704. The authentication token may be a random or cryptographically generate string of characters. For example, the authentication token may be a string of characters digitally signed by a private encryption key associated with a server or authentication process. The authentication token may be generated by a server or by a client device. In some implementations, the token may be generated and supplied by a third party provider.

In some implementations, verification of the user may occur on the client device and a federated identity is passed to a server, to an application store, and to the IoT applications. Federated identify may refer to methods of linking a person's electronic identify and attributes, stored across multiple systems. It can include, for example, the distribution of a token verifying the identity of the user across multiple systems.

The process receives a selection of an IoT application 706. Once authenticated, IoT applications may be presented for selection on a user interface of a client device. The user may select the IoT application by selecting the desired IoT application.

The process provides the authentication token 708. The authentication token can be provided to the selected IoT Application. The IoT application can verify the authentication token, for example, by verifying that the digital signature is authentic, or through other means.

The process 710 provides control of the IoT device. Once authenticated the IoT Application allows the user access to the IoT device consistent with the functionality of the IoT application.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
   authenticating, by a security platform, a user of a client device, the security platform comprising a plurality of Internet of Things (IoT) applications, each of the IoT applications being configured to control at least one corresponding IoT device;
   causing, in response to the authenticating, the client device to render a plurality of graphical representations on a user interface of the client device, each graphical representations representing one of the IoT applications;
   receiving selection data indicating a selection of a particular IoT application of the plurality of IoT applications by the user;
   providing, by the security platform, an authentication token associated with the user to the selected particular IoT application to authenticate the user with the selected particular IoT application; and
   providing, through the client device, control of at least one IoT device corresponding to the selected particular IoT application.

2. The computer-implemented method of claim 1, further comprising:
   generating, by the security platform, the authentication token for the user.

3. The computer-implemented method of claim 1, further comprising:
   receiving selection data indicating a selection of an uninstalled IoT application from a list of certified IoT applications, wherein the IoT applications are certified as functioning with the security platform; and installing the selected uninstalled IoT application to the security platform.

4. The computer-implemented method of claim 1, further comprising:
sending a command to a first IoT device based on a trigger provided by a second IoT device.

5. The computer-implemented method of claim 1, further comprising:
sending a command to the at least one IoT device corresponding to the selected particular IoT application based on a location of the client device.

6. The computer-implemented method of claim 1, further comprising:
certifying, by a computer system, a first IoT application for use with the security platform;
wherein the certifying comprises:
verifying that the first IoT application will accept a first authentication token as proof of identify; and
verifying that the first IoT application provides a predetermined level of security.

7. The computer-implemented method of claim 1, further comprising:
tracking the ownership of at least one IoT device controlled by the user by adding records of the at least one IoT device controlled by the user to a blockchain.

8. The computer-implemented method of claim 7, wherein tracking comprises one of: adding a record indicating that an IoT device was acquired by the user or adding a record indicting that an IoT device was relinquished by the user.

9. The method of claim 1, further comprising transferring the authentication of the user from the client device to a second client device by:
causing the client device to display an image on the user interface of the client device;
causing the second client device to display a plurality of different images on a user interface of the second client device;
receiving a user selection data indicating selection of a particular one of the plurality of different images displayed on the user interface of the second client device; and
selectively authenticating the user on the second client device based on whether the particular one of the plurality of different images matches the image displayed on the user interface of the client device.

10. A non-transitory computer storage medium encoded with computer program instructions that, when executed by one or more computers comprising a security platform, cause the one or more computers to perform operations comprising:
authenticating, by the security platform, a user of a client device, the security platform comprising a plurality of Internet of Things (IoT) applications, each of the IoT applications being configured to control at least one corresponding IoT device;
causing, in response to the authenticating, the client device to render a plurality of graphical representations on a user interface of the client device, each graphical representations representing one of the IoT applications;
receiving selection data indicating a selection of a particular IoT application of the plurality of IoT applications by the user;

providing, by the security platform, an authentication token associated with the user to the selected particular IoT application to authenticate the user with the selected particular IoT application; and providing, through the client device, control of at least one IoT device corresponding to the selected particular IoT application.

11. The non-transitory computer storage medium of claim 10, the operations further comprising:
generating, by the security platform, the authentication token for the user.

12. The non-transitory computer storage medium of claim 10, the operations further comprising:
receiving selection data indicating a selection of an uninstalled IoT application from a list of certified IoT applications, wherein the IoT applications are certified as functioning with the security platform; and
installing the selected uninstalled IoT application.

13. The non-transitory computer storage medium of claim 10, the operations further comprising:
sending a command to a first IoT device based on a trigger provided by a second IoT device.

14. The non-transitory computer storage medium of claim 10, the operations further comprising:
sending a command to the at least one IoT device corresponding to the selected particular IoT application based on a location of the client device.

15. The non-transitory computer storage medium of claim 10, the operations further comprising:
certifying, by a computer system, a first IoT application for use with the security platform;
wherein the certifying comprises:
verifying that the first IoT application will accept a first authentication token as proof of identify; and
verifying that the first IoT application provides a predetermined level of security.

16. A system comprising:
one or more computers comprising a security platform; and
one or more storage devices storing instructions that are operable, when executed by the one or more computers, to cause the one or more computers to perform operations comprising:
authenticating, by the security platform, a user of a client device, the security platform comprising a plurality of Internet of Things (IoT) applications, each of the IoT applications being configured to control at least one corresponding IoT device;
causing, in response to the authenticating, the client device to render a plurality of graphical representations on a user interface of the client device, each graphical representations representing one of the IoT applications;
receiving selection data indicating a selection of a particular IoT application of the plurality of IoT applications by the user;
providing, by the security platform, an authentication token associated with the user to the selected particular IoT application to authenticate the user with the selected particular IoT application; and
providing, through the client device, control of at least one IoT device corresponding to the selected particular IoT application.

17. The system of claim 16, the operations further comprising:
receiving selection data indicating a selection of an uninstalled IoT application from a list of certified IoT applications, wherein the IoT applications are certified as functioning with the security platform; and installing the selected uninstalled IoT application.

18. The system of claim 16, the operations further comprising:

sending a command to a first IoT device based on a trigger provided by a second IoT device.

19. The system of claim 16, the operations further comprising:

sending a command to the at least one IoT device corresponding to the selected particular IoT application based on a location of the client device.

20. The system of claim 16, the operations further comprising:

certifying, by a computer system, a first IoT application for use with the security platform;

wherein the certifying comprises:

verifying that the first IoT application will accept a first authentication token as proof of identify; and verifying that the first IoT application provides a predetermined level of security.

\* \* \* \* \*